United States Patent [19]

Schneider

[11] 4,294,514
[45] Oct. 13, 1981

[54] LIGHT-WAVE GUIDES AND METHOD OF PRODUCING SAME

[75] Inventor: Hartmut Schneider, Munich, Fed. Rep. of Germany

[73] Assignee: Siemens Aktiengesellschaft, Berlin & Munich, Fed. Rep. of Germany

[21] Appl. No.: 73,724

[22] Filed: Sep. 10, 1979

[30] Foreign Application Priority Data

Oct. 4, 1978 [DE] Fed. Rep. of Germany ....... 2843276

[51] Int. Cl.³ .................. G02B 5/14; C03B 37/00
[52] U.S. Cl. ........................ 350/96.31; 65/2
[58] Field of Search .......... 350/96.30, 96.31, 96.32; 65/1, 2, 3 R, 3 A, 4 B

[56] References Cited

U.S. PATENT DOCUMENTS

| | | | |
|---|---|---|---|
| 3,355,273 | 11/1967 | Siegmund et al. | 65/4 B |
| 3,817,731 | 6/1974 | Yoshiyagawa | 350/96.31 X |
| 3,963,468 | 6/1976 | Jaeger et al. | 65/3 A |
| 4,165,222 | 8/1979 | de Panafieu et al. | 65/2 |

FOREIGN PATENT DOCUMENTS

740417 4/1970 Belgium ............... 350/96.31
1460333 1/1977 United Kingdom ....... 350/96.31

*Primary Examiner*—John K. Corbin
*Assistant Examiner*—John D. Lee
*Attorney, Agent, or Firm*—Hill, Van Santen, Steadman, Chiara & Simpson

[57] ABSTRACT

A light-wave guide fiber is pulled from a uniform fiber-yielding material and the peripheral surface areas (cladding) of such fiber are enriched with a gas soluble in the fiber material at temperatures below the softening temperature of the fiber and at relatively high pressure (for example, via high pressure/high temperature diffusion). The excess pressure resulting in the cladding is equalized by a subsequent temporary heating of the fiber above the softening temperature which causes a change of density in the fiber core. Thereafter, the gas is diffused out of the cladding at a lower temperature. The resultant fiber exhibits a radially outwardly decreasing refractive index.

5 Claims, 2 Drawing Figures

LIGHT-WAVE GUIDES AND METHOD OF PRODUCING SAME

BACKGROUND OF THE INVENTION

1. Field of the Invention:

The invention relates to light-wave guides and somewhat more particularly to a method of producing light-wave guides comprised of low-light loss fibers having a refractive index which decreases in a radial direction.

2. Prior Art:

A known method of producing light-wave guides (i.e., a light conductive fiber) having a refractive index which continuously decreases toward the peripheral surface of the guide (a so-called gradient fiber) is the double-crucible process. In such a process, a fiber core is drawn from a first crucible filled with a highly transparent molten material (for example, barysilite glass) through a first nozzle and such newly drawn fiber core is then coated with an envelope of another material (for example, a glass having a lower refractive index). Such coating is applied from a second crucible having a second nozzle, generally an annular nozzle receiving the fiber core along its center axis and applying a layer of the other material about the core periphery. Because of the inter-diffusion of the core glass atoms and those of the enveloping glass, a fiber structure is produced having a refractive index which continuously decreases from the refractive index of the core glass toward the refractive index of the envelope glass. While generally, this method is utilized to continuously produce relatively large fiber lengths, there are nevertheless drawbacks in that often contaminants are carried from the crucibles into the ultimate fiber and cause significant light losses and/or scattering. Further, the method is limited to the manufacture of multi-component glass fibers with quickly diffusing glass components.

The CVD (Chemical Vapour Deposition) process is also often used in producing gradient fibers whereby a silica glass hollow tube is coated on its inside with a synthetic glass deposited from a gaseous reaction and the resultant multi-coated tube is then drawn out to form an optical fiber. A mixture of $SiCl_4$, $GeCl_4$ and $O_2$ is typically employed as a gas mixture capable of depositing a $SiO_2$-$GeO_2$-glass. With this type of process, one attains a non-homogeneous fiber composed of a fiber material which has different chemical compositions on its inside relative to its outside and accordingly exhibits a desired change of refractive index. In general, these types of light-guides have good transmission properties for light signals, however, the process for producing such fibers is disadvantageous because it must be intermittently operated and this can cause periodic as well as irregular refractive index profile fluctuations.

SUMMARY OF THE INVENTION

The invention provides a method of producing a low loss light wave guide having a refractive index which decreases radially outwardly from the fiber axis. In accordance with the principles of the invention, a low loss fiber having a refractive index which decreases radially is produced by drawing a fiber from a substantially uniform fiber-yielding material and then substantially saturating the peripheral surface area of the drawn fiber with a gas soluble in the fiber material by contacting such drawn fiber with such gas under relatively high pressure conditions and at relatively high temperatures below the softening temperatures of the fiber material. Thereafter, the fiber is briefly heated above its softening temperature and then the gas is diffused out of the peripheral surface areas of the fiber.

The invention provides a new and simple method of producing light-wave guides whereby the danger of contamination as well as the danger of refractive index profile fluctuations is materially reduced.

DESCRIPTION OF THE PREFERRED EMBODIMENTS

Figure 1:
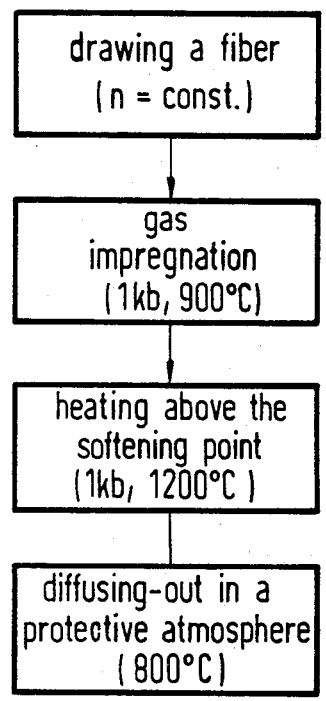
FIG. 1 is a flow chart of an exemplary embodiment of the invention.
Figure 2:
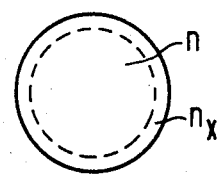
FIG. 2 is a schematic cross-sectional view of a typical fiber in accordance with the present invention.

The invention provides a method of producing low loss light-wave guides having a refractive index which decreases radially outwardly whereby the danger of contamination and the danger of refractive index profile fluctuations is reduced in a simple and reliable manner.

In the interstitial locations present, for example, in a silica glass, many single and double atom gases, for example inert gases, $H_2$, $O_2$ or $N_2$ can be inserted since the solubility of these gases increases linearly with elevated gas pressures and approaches saturation at pressures above approximately 1 kb. The solubility coefficient $C_i/C_g$, i.e., the ratio of the dissolved gas concentration, $C_i$, to the concentration, $C_g$, of the gas in an atmosphere is set, for example, at 0.024 (helium); 0.019 (neon); 0.03 (hydrogen); 0.01 (argon or oxygen) and the total number of interstitial locations available in a silica glass for these gases is about 1 to $3 \times 10^{21}$ cm$^{-3}$. This corresponds to a hole concentration of about 4 to 12 mol. %, i.e, 1/15 to about 1/7 free lattice sites are available per $SiO_2$ formula unit.

In an exemplary embodiment, given a pressure of 850 atm., a hydrogen molecule concentration of $6 \times 10^{20}$ cm$^{-3}$ (corresponding to 2.6 mol. %) and a neon atom concentration of about $3.5 \times 10^{20}$ cm$^{-3}$ (corresponding to about 1.6 mol. %) was found in a silica glass. Further, at a pressure of 2 kb and a temperature of about 650° C., approximately 1 mol. % of argon can be dissolved in silica glass and, at 10 kb and a temperature of 800° C., approximately 7 mol, % argon can be dissolved in a glass having a composition of $K_2O.4SiO_2$.

Such gas concentrations in a glass cause a significant pressure increase within the glass. Accordingly, at temperatures below the softening point of the glass, the peripheral surface areas of a fiber composed of such a glass or other glass-like low-loss (extinction poor) material are saturated with such a gas (for example via a diffusion from an appropriate gas atmosphere under relatively high pressure and high temperature conditions), and cause a significant radial pressure increase in the fiber. During a subsequent heating of such saturated fiber above its softening point, such pressure difference is equalized, thereby producing an increase of density within the interior of the fiber. Subsequentially, the gases are removed from the peripheral surface areas at lower temperaures, for example by diffusion in a vacuum, so that the remaining fiber material in the interior of the fiber has a higher density than the outer areas thereof. Such difference in density causes a radially outward decrease of the refractive index necessary in low-loss light-wave guides.

In addition to the gases already mentioned, which are physically dissolved in glass, other gases may also be utilized in the practice of the invention. Such other gases have a solubility in glass-like materials dependent on a reversible chemical processes, for example, at temperatures above about 500° C., hydrogen, hydrogen fluoride, hydrogen chloride, halogens, water ammonia, including the corresponding deuterized compounds as well as carbon monoxide and nitrogen monoxide can be utilized. In the practice of the invention, a particularly large refractive index decrease is attained when a gas is dissolved in the fiber peripheral surface areas up to the saturation of such gas in such fiber material, however, lower gas concentrations may also be utilized to produce adequate refractive index decreases.

Referring now to the drawing, an exemplary process of the invention is illustrated as generally comprising drawing a select diameter fiber from, for example, a conventional silica glass material having a constant refractive index, n. Next, the newly-drawn fiber is subjected to gas impregnation under relatively high pressure-temperature conditions in the presence of a select gas whereby at least peripheral surface areas of the fiber are impregnated or saturated with such gas. The temperature utilized is preferably just below the softening temperature of the fiber material and can range from about 650° C. to 1490° C. and typically is about 900° C. The pressure utilized during this gas saturation ranges between about 1 to 3 kb. These pressure-temperature conditions are maintained for a relatively brief period of time ranging from a few minutes up to about 1 hour. Next, the so-saturated fiber is briefly heated above the softening temperature of the fiber material and then the gas dissolved in the peripheral surfaces areas of the fiber is diffused out at temperatures somewhat lower than those earlier utilized. In this manner, a gradient fiber having a substantially homogeneous chemical composition is attained and such single material fiber exhibits an index of refraction, $n_x$ at its peripheral surface area which is lower than an index of refraction, n, at the center area thereof.

With the foregoing general discussion in mind, there is now presented a detailed example which will illustrate to those skilled in the art the manner in which the invention is carried out. However, the example is not to be construed as limiting the scope of the invention in any way.

EXAMPLE

A fiber of approximately 100μ thickness is drawn in a traditional manner from a conventional silica glass. The silica glass fiber is subjected to a high pressure impregnation in an argon atmosphere of preferably about 1 kb and at a temperature of approximately 900° C. for approximately 20 minutes. Thereafter, the resultant fiber is briefly heated above its softening temperature, for example, it is heated up to 1200° C. In order to avoid the formation of bubbles within the fiber, the increased pressure can be maintained during this brief heating step. This overall process can occur in a gas autoclave. Thereafter, the autoclave is cooled to temperatures below the softening point, (for example to a temperature of about 800° C.) and is then filled with a protective atmosphere.

The above exemplary embodiment may be modified in order to provide a further saving in time by conducting the gas impregnation substantially simultaneously with the drawing of the fiber. However, such modification necessarily causes an increased manufacturing cost since the drawing apparatus must then be pressurized.

By practicing the principles of the invention, one can successfully manufacture a single material fiber having a peripheral zone of reduced density and thus, lower index of refraction relative to the central zone of such fiber. With the process of the invention, the danger of contamination and fluctuations of homogeneity are substantially avoided.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, except as it is set forth and defined in the hereto-appended claims.

I claim as my invention:

1. A method of producing a low loss light-wave guide having a refractive index which decreases radially outwardly, comprising:
    drawing a fiber from a substantially homogeneous fiber-yielding material;
    substantially saturating peripheral surface areas of said fiber with a gas soluble in said fiber material and capable of diffusion at relatively high pressures by contacting said drawn fiber with said gas under relatively high temperatures below the softening temperature of the fiber material and under relatively high pressures;
    heating the resultant fiber to a temperature above the softening temperature of said fiber; and
    diffusing-out gas dissolved in the peripheral surface areas of said fiber at a relatively lower temperature.

2. A method as defined in claim 1 wherein said drawing and said saturation occur substantially simultaneously.

3. A method as defined in claim 1 wherein said high temperatures range between about 650° to 1490° C. and said high pressures range between about 1 to 3 kb.

4. A method as defined in claim 3 wherein said high temperatures and high pressures are maintained for a period of time ranging from a few minutes up to about 1 hour.

5. A low loss light-wave guide comprising a fiber composed of a substantially chemically homogeneous material having a given density along the center axis thereof and a density lower than said given density at peripheral surface areas thereof whereby such fiber exhibits a radially outwardly decreasing refractive index.

* * * * *